UNITED STATES PATENT OFFICE.

GEORGE BAKER DUNBAR, OF DETROIT, MICHIGAN.

PLASTIC COMPOSITION AND PROCESS OF MAKING SAME.

1,299,922.              Specification of Letters Patent.       Patented Apr. 8, 1919.

No Drawing.        Application filed July 29, 1918.   Serial No. 247,157.

*To all whom it may concern:*

Be it known that I, GEORGE BAKER DUNBAR, a citizen of the United States, residing at Detroit, in the county of Wayne and State of Michigan, have invented certain new and useful Improvements in Plastic Compositions and Processes of Making Same, of which the following is a specification.

My invention relates to improvements in plastic compositions and process of making same, the composition being particularly designed and adapted for use in molding or pressing into suitable shape various light weight articles which will not only be fire proof, but adapted to resist the action of acids, sudden changes in temperature, and the like.

The improved composition is particularly adapted for use as a filling or covering material for metal parts in protecting the latter from injury or deterioration by the action of various deteriorating elements.

By reason of the above my composition is admirably adapted for use in the manufacture of shell-plugs for temporarily inserting and sealing the interiorly threaded ends of explosive shells until such time as it is desired to insert the firing charge therein.

My improved composition comprises the following ingredients combined in substantially the proportions stated, to wit,—

Resin _____ 60%
Shellac _____ 3%
Mineral fiber (preferably asbestos) ___ 25%
Carbon (preferably lamp black) _____ 12%

If desired the proportion of mineral fiber may be reduced somewhat, for example say 22% and the following ingredients added in substantially the proportions stated:

Litharge _____ 2%
Calcium or magnesium carbonate _____ 1%

The litharge may be added to neutralize the acids and foreign matter in the composition, and the shellac, preferably in the form of gum shellac, adapted to cause the composition to shrink while being molded and thus release the molded material from the molds.

In preparing my improved plastic composition the resin is heated to approximately 300° Fahrenheit; while at such degree of heat the shellac, preferably in the form of gum shellac, and the carbon, in the form of lamp black, are added thereto and thoroughly incorporated therewith, after which the resulting material is heated to 450° Fahrenheit, or more. At this stage of the process a small amount of litharge and calcium or magnesium carbonate (and under certain conditions a mineral cementing substance) may be added, after which the temperature is reduced to approximately 150° and a suitable mineral fiber, preferably asbestos, is added and thoroughly incorporated therein, such asbestos fiber acting as a binding agent and giving strength and fireproof qualities to the resulting article.

It is understood that I do not limit myself to the exact quantities of the various ingredients of my composition, as above enumerated, as it is obvious that the percentage of the various ingredients may be varied within reasonable limits to meet the particular demands or qualities in actual service of the particular article desired, without departing from the spirit of my invention.

Having thus described some of the embodiments of my invention, without having attempted to set forth all the forms in which it may be made or all the modes of its use, what I claim and desire to secure by Letters Patent is:—

1. A plastic composition, comprising 60% resin, 3% shellac, and 12% carbon combined with 25% fibrous mineral material.

2. The process of making plastic compositions, comprising (1) heating resin to about 300° Fahrenheit, (2) adding and thoroughly incorporating therewith shellac and carbon and heating to about 450° Fahrenheit, and (3) reducing the temperature to approximately 150° and adding thereto asbestos fiber.

3. The process of making a fire and acid resisting plastic composition, comprising (1) heating resin to approximately 300° Fahrenheit, (2) thoroughly incorporating therewith at such temperature shellac and lamp black and raising the heat to approximately 450° Fahrenheit, and (3) reducing the temperature to approximately 150°, and (4) then adding thereto asbestos fiber.

In testimony whereof I have affixed my signature in the presence of two witnesses.

GEORGE BAKER DUNBAR.

Witnesses:
EDWARD HUBERT STILWILL,
MATTIE R. SLOCUM.